United States Patent
Wada et al.

(10) Patent No.: US 7,253,993 B2
(45) Date of Patent: Aug. 7, 2007

(54) HEAD SLIDER WITH PRECISE POSITIONING ACTUATOR AND MANUFACTURING METHOD OF THE HEAD SLIDER

(75) Inventors: Takeshi Wada, Tokyo (JP); Masashi Shiraishi, Kwai Chung (HK); Takashi Honda, Tokyo (JP); Norikazu Ota, Tokyo (JP)

(73) Assignees: TDK Corporation, Chuo-ku, Tokyo (JP); SAE Magnetics (H.K.) Ltd., Kwai Chung, N.T. (HK)

( * ) Notice: Subject to any disclaimer, the term of this patent is extended or adjusted under 35 U.S.C. 154(b) by 652 days.

(21) Appl. No.: 10/081,236

(22) Filed: Feb. 25, 2002

(65) Prior Publication Data

US 2002/0159192 A1  Oct. 31, 2002

(30) Foreign Application Priority Data

Feb. 27, 2001 (JP) ............................ 2001-051998

(51) Int. Cl.
 *G11B 5/60* (2006.01)
(52) U.S. Cl. ............................ 360/235.8; 360/234.6; 360/294.4
(58) Field of Classification Search ............. 360/235.8, 360/234.6, 294.4
 See application file for complete search history.

(56) References Cited

U.S. PATENT DOCUMENTS

| 5,276,573 | A | * | 1/1994 | Harada et al. | ............ | 360/235.3 |
| 5,327,311 | A | * | 7/1994 | Ananth et al. | ............ | 360/235.6 |
| 5,587,857 | A | * | 12/1996 | Voldman et al. | ......... | 360/234.4 |
| 5,708,540 | A | * | 1/1998 | Ananth et al. | ............ | 360/235.4 |
| 5,943,189 | A | * | 8/1999 | Boutaghou et al. | ...... | 360/234.7 |
| 6,246,552 | B1 | * | 6/2001 | Soeno et al. | ............. | 360/294.4 |
| 6,282,066 | B1 | * | 8/2001 | Bonin | ...................... | 360/294.1 |
| 6,289,564 | B1 | * | 9/2001 | Novotny | .................... | 29/25.35 |
| 6,362,939 | B1 | * | 3/2002 | Crane et al. | ............. | 360/294.5 |
| 6,404,109 | B1 | * | 6/2002 | Takeuchi et al. | ............ | 310/348 |
| 6,414,822 | B1 | * | 7/2002 | Crane et al. | ............. | 360/294.5 |
| 6,414,823 | B1 | * | 7/2002 | Crane et al. | ............. | 360/294.5 |
| 6,487,045 | B1 | * | 11/2002 | Yanagisawa | ............. | 360/236.5 |
| 6,587,314 | B1 | * | 7/2003 | Lille | .......................... | 360/313 |
| 6,661,617 | B1 | * | 12/2003 | Hipwell, Jr. et al. | ..... | 360/294.4 |
| 6,751,069 | B2 | * | 6/2004 | Yao et al. | ................. | 360/294.4 |

FOREIGN PATENT DOCUMENTS

| JP | 5-210933 | 8/1993 |
| JP | 2000-113615 | 4/2000 |
| JP | 2000-348321 | 12/2000 |
| JP | 2000-348451 | 12/2000 |

OTHER PUBLICATIONS http://www.zrchem.com/pdf/MEL305.pdf, Material Data sheet for Zirconium Oxide, Electronic Grade, CAS No. 1314-23-4.*

* cited by examiner

*Primary Examiner*—Angel Castro
*Assistant Examiner*—Christopher R. Magee
(74) *Attorney, Agent, or Firm*—Buchanan Ingersoll & Rooney PC

(57) ABSTRACT

A head slider with a precise positioning actuator includes a thin plane shaped head section provided with a first surface that is substantially perpendicular to an ABS of the head slider, a second surface opposite to the first surface and at least one head element formed on the first surface, and an actuator section located at a side of the second surface of the head section and integrally fixed to the head section, for precisely positioning the at least one head element.

10 Claims, 10 Drawing Sheets

HEAD SLIDER WITH PRECISE POSITIONING ACTUATOR AND MANUFACTURING METHOD OF THE HEAD SLIDER

FIELD OF THE INVENTION

The present invention relates to a head slider with a precise positioning actuator for a head element such as a thin-film magnetic head element or an optical head element, and to a manufacturing method of the head slider.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there are various structures of actuator such as for example a load-beam structure actuator and a piggy-back structure actuator.

The load-beam structure actuator has two piezoelectric elements of PZT attached on a load beam of a suspension. These PZT elements are driven in a manner to support with each other to displace the load beam so as to perform fine precise positioning of a magnetic head slider mounted on the load beam.

The piggy-back structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator.

However, since the aforementioned conventional precise positioning actuator is designed to displace the whole of the suspension or the whole of the magnetic head slider, a mass of the displaced part is heavy. Thus, such actuators had following various problems:

(1) A material to be used for the actuator is limited because it is necessary to provide a very large displacement;
(2) A high drive voltage required to apply to the actuator in order to achieve a large displacement can have a detrimental effect on an electromagnetic conversion characteristics of the magnetic head element;
(3) Flexibility in designing an actuator shape is quite low because a material and a structure of the actuator are limited and thus a driver structure of the actuator and driven directions are determined; and
(4) A vibration characteristics of a suspension is bad because a mechanical resonance occurs at a relatively low frequency.

Also, since the conventional precise positioning actuator is designed to displace the whole of the magnetic head slider so as to perform fine precise positioning of a magnetic head element, the attitude of an air bearing surface (ABS) of the magnetic head slider may change when the magnetic head element is displaced by the actuator causing a flying characteristics of the slider to deteriorate.

Yukihiro UEMTSU, "Magnetic Disk Drive Apparatus and Piggy-Back Actuator", Electronics, pp. 46-48, September 1998 discloses a magnetic head slider structure with a micro-actuator embedded in the slider in order to reduce a mass of the displacing section of the actuator.

When fabricating magnetic head sliders with such micro-actuators, however, it is required to integrate micro-actuator structures concurrently with the integration of magnetic head elements. Thus, it is very difficult to adopt this structure because the current manufacturing process of the magnetic head elements has to change radially. Furthermore, since a stroke of such micro-actuator is very small, such magnetic head slider is quite impractical.

SUMMARY OF THE INVENTION

It is therefore an object of the present invention to provide a head slider with a precise positioning actuator and a manufacturing method of the head slider, whereby a mass of a displacing section of the actuator can be reduced without changing a manufacturing process of a head element.

Another object of the present invention is to provide a head slider with a precise positioning actuator and a manufacturing method of the head slider, whereby a sufficient stroke can be obtained without changing a manufacturing process of a head element.

According to the present invention, a head slider with a precise positioning actuator includes a thin plane shaped head section provided with a first surface that is substantially perpendicular to an ABS of the head slider, a second surface opposite to the first surface and at least one head element formed on the first surface, and an actuator section located at a side of the second surface of the head section and integrally fixed to the head section, for precisely positioning the at least one head element.

The head section is formed in a thin plane shape and has a head element on a first surface that is substantially perpendicular to an ABS of the head slider, and an actuator section is integrally fixed to thus formed head section at a side of the second surface opposite to the first surface of the head section. Therefore, a driving movable part of the actuator section can be formed in an extremely light mass. Also, the head element can be formed on the head section by a conventional manufacturing process. Furthermore, because the actuator section has a separated structure from the head section, it is possible to easily fabricate an actuator section with a sufficiently large displacement.

It is preferred that the ABS is formed in the actuator section.

It is also preferred that the actuator section is fixed to the second surface of the head section. In this case, preferably, the actuator section includes a base member and an actuator layer laminated on the base member, and a surface of the actuator layer, which is opposite to the base member, is fixed to the second surface of the head section. Also, preferably, the ABS is formed in the base member.

It is preferred that the actuator section is fixed to both side surfaces of the head section. In this case, preferably, the actuator section includes a pair of movable arms capable of displacing its top end portions in response to a drive signal applied to the actuator section, the side surfaces of the head section being fixed to the top end portions, and a static part formed between the pair of movable arms with spaces. It is further preferred that the ABS is formed in the static part. Since the displacement is occurred at the head section only and no displacement is occurred at the ABS formed on the static part of the actuator section, the attitude of the ABS will not change so as to always keep a stable flying characteristics of the slider.

It is preferred that the actuator section further includes a base to be fixed to a support means of the head slider, and that the pair of movable arms extend from the base along the air bearing surface. Also, it is preferred that each of the pair of movable arms includes an arm member, and a piezoelectric element formed on or fixed to a surface of the arm member.

According to the present invention, also, a manufacturing method of a head slider with a precise positioning actuator, includes a step of forming a plurality of head elements on a front surface of a head element substrate, a step of grinding a rear surface of the head element substrate with the plurality of head elements formed to have a thin head element substrate, a step of dicing the thin head element substrate into a plurality of individual first members, and a step of integrally fixing a second member with at least one precise positioning actuator section to each of the first members so as to obtain a fixed member with the at least one precise positioning actuator section located at a rear surface side of the first member.

A rear surface of the head element substrate with the plurality of head elements formed on a front surface is ground to thin it, then the thinned substrate is diced into a plurality of first members, and a second member with at least one precise positioning actuator section is integrally fixed to the first member at a rear surface side of the first member. Thus, a driving movable part of the actuator section can be formed in an extremely light mass, and the head element can be formed on the head section by a conventional manufacturing process. Furthermore, because the actuator section member is separately formed and then fixed to the head section member, it is possible to easily fabricate an actuator section with a sufficiently large displacement.

It is preferred that the dicing step includes cutting and separating the thin head element substrate into individual head sections, and that the fixing step includes integrally fixing an actuator section to each of the head sections so as to obtain a head slider with the actuator section located at a rear surface side of the head section.

In this case, it is also preferred that the fixing step includes fixing an actuator layer laminated on a base member of the actuator section to the rear surface of the head section to obtain a head slider.

Alternately, it is preferred that the method further includes a step of preparing the actuator section that includes a pair of movable arms capable of displacing its top end portions in response to a drive signal applied to the actuator section and a static part formed between the pair of movable arms with spaces, and that the fixing step includes fixing side surfaces of the head section to the top end portions of the pair of movable arms. In this case, preferably, the preparing step includes preparing the actuator section including a base to be fixed to a support means of the head slider, the pair of movable arms extending from the base. More preferably, each of the pair of movable arms includes an arm member and a piezoelectric element formed on or fixed to a surface of the arm member.

It is preferred that the dicing step includes dicing the thin head element substrate into a plurality of individual first bar members each having a plurality of head elements aligned, that the fixing step includes integrally fixing a second bar member with a plurality of actuator sections aligned to each of the first bar member so as to obtain a fixed bar member with the plurality of actuator sections located at a rear surface side of the first bar member, and that the method further includes a step of cutting and separating the fixed bar member into individual head sliders.

In this case, it is preferred that the fixing step includes fixing an actuator layer laminated on a base member of the second bar member to a rear surface of the first bar member so as to obtain the fixed bar member.

Alternately, it is preferred that the method further includes a step of preparing the second bar member each including a pair of movable arm regions capable of displacing its top end portions in response to a drive signal applied thereto and a static part region formed between the pair of movable arm regions with spaces, and that the fixing step includes fixing side surfaces of the first bar member to the top end portions of the pair of movable arm regions of the second bar member. In this case, preferably, the preparing step includes preparing the second bar member including a base region to be fixed to a support means, the pair of movable arm regions extending from the base region. More preferably, each of the pair of movable arm regions includes an arm member region and a piezoelectric element region formed on or fixed to a surface of the arm member region.

According to the present invention, further, a manufacturing method of a head slider with a precise positioning actuator, includes a step of forming a plurality of head elements on a front surface of a head element substrate, a step of grinding a rear surface of the head element substrate with the plurality of head elements formed to have a thin head element substrate, a step of integrally fixing an actuator section substrate with a plurality of precise positioning actuator sections to a rear surface of the thin head element substrate so as to obtain a fixed substrate, and a step of cutting and separating the fixed substrate into individual head sliders.

A rear surface of the head element substrate with the plurality of head elements formed on a front surface is ground to thin it, then an actuator section substrate with a plurality of actuator sections is integrally fixed to the thinned substrate, and then it is diced into individual head sliders. Thus, a driving movable part of the actuator section can be formed in an extremely light mass, and the head element can be formed on the head section by a conventional manufacturing process. Furthermore, because the actuator section substrate is separately formed and then fixed to the head element substrate, it is possible to easily fabricate an actuator section with a sufficiently large displacement.

It is preferred that the fixing step includes fixing an actuator layer laminated on a base member of the actuator section substrate to a rear surface of the thin head element substrate so as to obtain the fixed substrate.

The aforementioned manufacturing method, preferably, further includes a step of forming at least one ABS on the actuator section for a head slider.

According to the present invention, still further, a manufacturing method of a head slider with a precise positioning actuator, includes a step of forming a plurality of head elements on a front surface of a head element substrate, a step of dicing the head element substrate with the plurality of head elements formed into a plurality of members, a step of grinding a rear surface of each of the members to have a thin members, and a step of integrally fixing an actuator section member with a plurality of precise positioning actuator sections to the thin member so as to obtain a fixed member with the precise positioning actuator sections located at a rear surface side of the thin member.

A head element substrate with the plurality of head elements formed on a front surface is diced into a plurality of members, then a rear surface of the member is ground to thin it, and an actuator section member with a plurality of actuator sections is integrally fixed to the thinned member at a rear surface side of the thinned member. Thus, a driving movable part of the actuator section member can be formed in an extremely light mass, and the head element can be formed on the head section by a conventional manufacturing process. Furthermore, because the actuator section member is separately formed and then fixed to the head section member, it is possible to easily fabricate an actuator section with a sufficiently large displacement.

It is preferred that each of the head elements is a thin-film magnetic head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
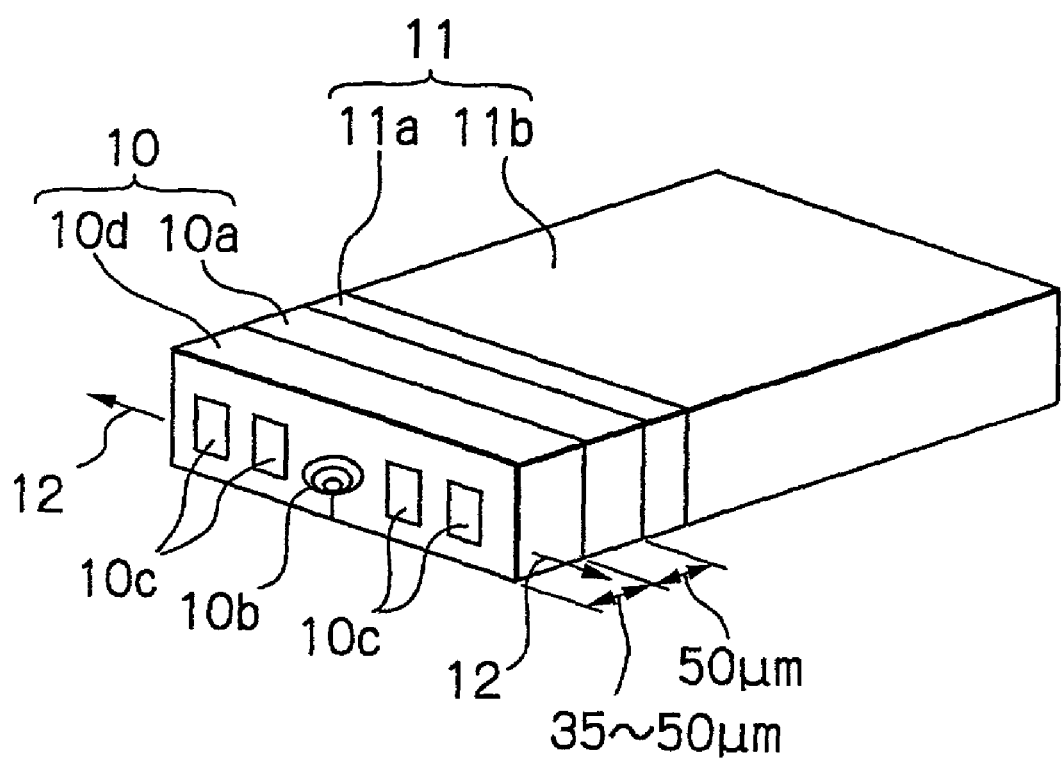
FIG. 1 is an oblique view schematically illustrating a magnetic head slider with a precise positioning actuator in a preferred embodiment according to the present invention.

FIG. 1 schematically illustrates a magnetic head slider with a precise positioning actuator in a preferred embodiment according to the present invention.

In the figure, reference numeral 10 denotes a magnetic head section constituted by a very thin substrate 10a with a thickness of about 50 µm for example and a thin-film layer 10d with a thickness of about 35-50 µm formed on the substrate 10a, and 11 denotes an actuator section fixed by an adhesion for example to a rear surface of the magnetic head section 10, which is opposite to an element-formed surface or a front surface. The thin-film layer 10d includes a thin-film magnetic head element 10b and its terminal electrodes 10c.

The actuator section 11 is constituted by a base member 11b and a thin actuator layer 11a laminated on the base member 11b. An surface of the actuator layer 11a, which is opposite to a surface laminated on the base member 11b is fixed to the rear surface of the magnetic head section 10. On a bottom surface of the actuator section 11, which is hidden in the figure or which is perpendicular to the element-formed surface of the magnetic head section 10, an ABS is formed.

The substrate 10a of the magnetic head section 10, in the embodiment, is an $Al_2O_3$-TiC substrate that has been typically used for a magnetic head slider substrate. However, a thickness, namely a length in a top-and-rear direction, of the substrate 10a is determined to a very small value as about 50 µm for example. The thin-film magnetic head element 10b and the terminal electrodes 10c are fabricated by a thin-film manufacturing process similar to the conventional process.

The actuator section 11 is fabricated using a semiconductor integrating process. Namely, on a relatively thick zirconia base member 11b with the similar thickness as the conventional $Al_2O_3$-TiC substrate typically used for the magnetic head slider, an actuator layer 11a with an electrostatic effect structure is formed by the semiconductor integrating process. As will be described later, since this actuator section 11 is individually fabricated from the magnetic head section 10, any type of actuator structures such as a piezoelectric effect structure, a electrostrictive effect structure and electromagnetic inductive structure can be easily adopted other than the electrostatic effect structure.

A size of the magnetic head slider with the magnetic head section 10 and the actuator section 11 in this embodiment is 1.25 mm×1.0 mm×0.3 mm for example which is substantially the same as that of the conventional magnetic head slider, and also an outer shape of this magnetic head slider is substantially the same as that of the conventional magnetic head slider.

By applying a drive voltage to the actuator layer 11a via signal electrodes (not shown), this actuator layer 11a linearly displaces to a lateral direction as shown by an arrow 12. Thus, the magnetic head section 10 linearly displaces in the lateral direction in a similar manner to precise position the magnetic head element 10b.

Since the magnetic head section 10 that is a movable part is thin and very light in mass, a sufficient displacement can be expected even by a very small drive force. It is important that the displacement is occurred at the magnetic head section 10 only and that no displacement is occurred at the ABS formed on the base member 11b of the actuator section 11. Therefore, the attitude of the ABS will not change so as to always keep a stable flying characteristics of the slider.

Because of the extremely light mass of the movable part, following various advantages can be obtained:

(a) An actuator of a low-voltage drive type can be utilized to avoid to have a detrimental effect on an electromagnetic conversion characteristics of the magnetic head element;
(b) An actuator can be formed with a structure and of a material that will present a small displacement force;
(c) High flexibility in designing an actuator can be expected; and
(d) A vibration characteristics of a suspension will not be deteriorated because a mechanical resonance occurs at a relatively high frequency.

Figure 2:
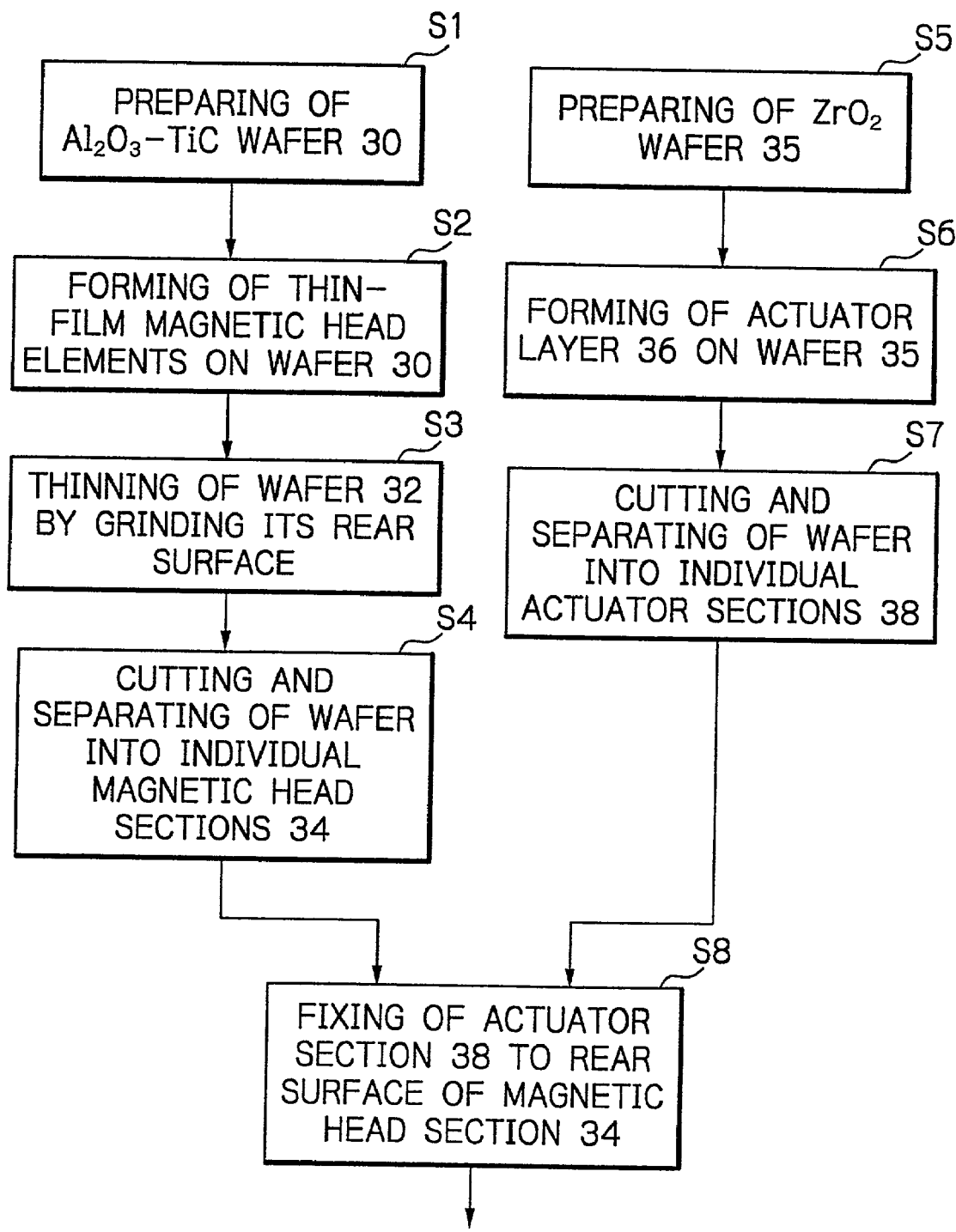
FIG. 2 is a flow chart illustrating a part of a manufacturing process of the magnetic head slider in the embodiment of FIG. 1.
Figure 3:
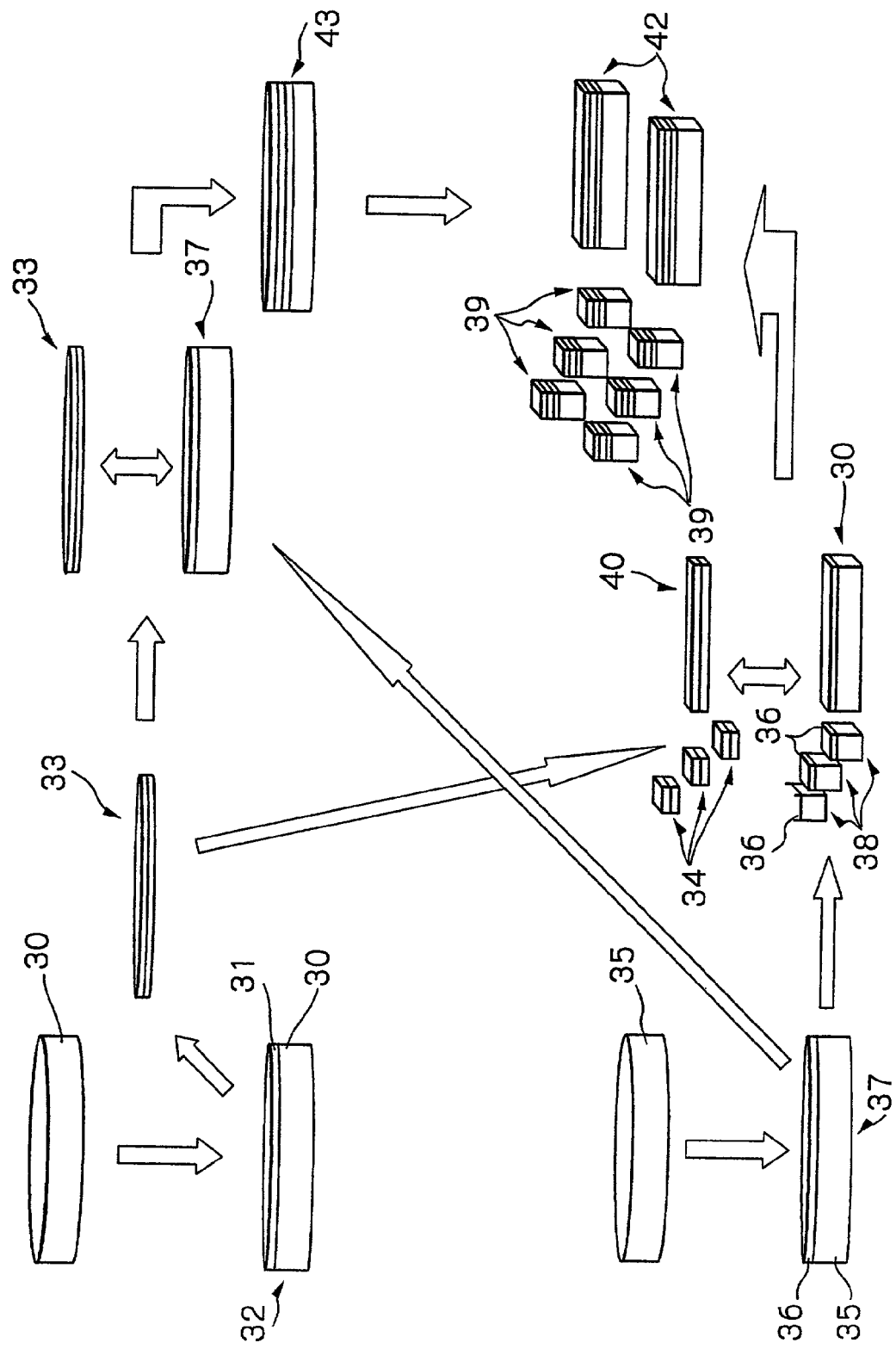
FIG. 3 is a view illustrating a part of a manufacturing process of the magnetic head slider in the embodiment of FIG. 1 and its modifications.

FIG. 2 illustrates a flow of a part of a manufacturing process of the magnetic head slider in the embodiment of FIG. 1, and FIG. 3 illustrates a part of a manufacturing process of the magnetic head slider in the embodiment of FIG. 1 and its various modifications. Here, the manufacturing process of the magnetic head slider in this embodiment will be described.

First, an $Al_2O_3$-TiC wafer 30 with the same thickness as that of the conventional wafer is prepared (step S1). Then, by forming many thin-film magnetic head elements and their electrode terminals on the $Al_2O_3$-TiC wafer 30 using the conventional thin-film integration technique, an wafer 32 with a thin-film layer 31 on its surface is obtained (step S2).

Then, a rear surface of this element-integrated wafer 32 is ground to obtain a very thin wafer 33 with a wafer section thickness not including a thickness of the integrated elements, of about several tens μm (step S3). Current working machine can grind the wafer to such thin thickness but in future it may be possible to grind the wafer thinner.

It is possible to integrate thin-film magnetic head elements on an wafer preliminarily thinned. However, in this case, the wafer may be easily deformed during the integration process causing the fabrication process of the thin-film magnetic head elements to become difficult. Thus, it is desired to grind the wafer after the integration of the thin-film magnetic head elements thereon.

Thereafter, the thinned wafer 33 is cut and separated into individual pieces of magnetic head sections 34 (step S4).

On the other hand, a relatively thick zirconia ($ZrO_2$) wafer 35 with the same thickness as that of the conventional $Al_2O_3$-TiC wafer is prepared (step S5). Then, by forming many electrostatic structure actuator elements on the wafer 35 using a semiconductor integration technique, an wafer 37 with the actuator layer 36 on its surface is obtained (step S6).

Then, the wafer 37 is cut and separated into individual pieces of actuator sections 38 (step S7). ABSs are formed on bottom surfaces of the actuator sections during this cut and separation process. More concretely, after the wafer 37 is diced into a plurality of bar members each having a plurality of actuator sections aligned, the ABSs are formed on the bottom surfaces of the respective actuator sections and then each bar member is cut and separated into individual pieces of the actuator sections 38.

Thereafter, a surface of the actuator layer 36 of each actuator section piece 38 is adhered or bonded to a rear surface of each magnetic head section piece 34 by a resin adhesive or by a glass bonding and thus an individual magnetic head slider 39 is obtained (step S8).

Figure 4:
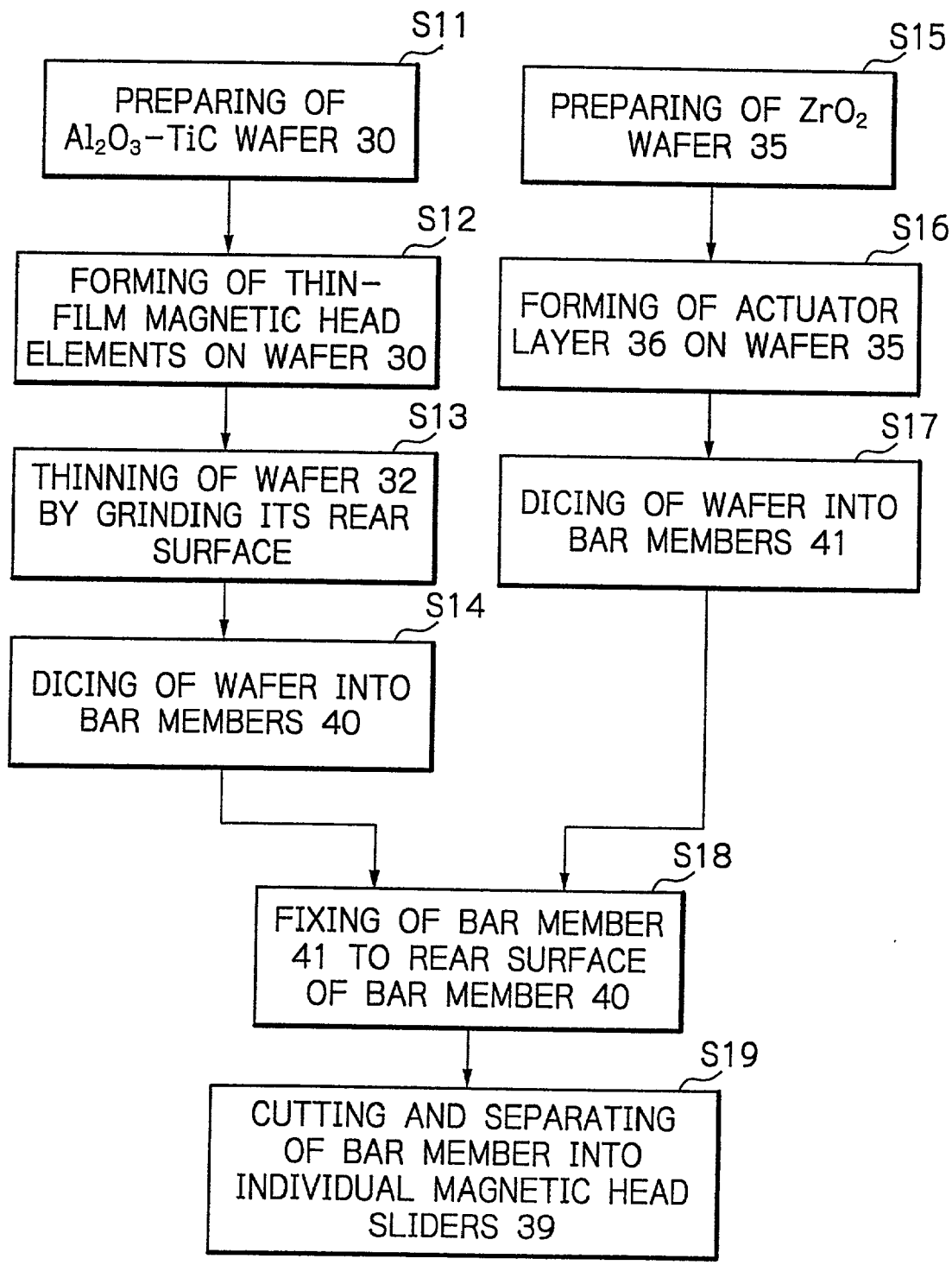
FIG. 4 is a flow chart illustrating a part of a manufacturing process of a magnetic head slider in a modification of the embodiment of FIG. 1.

FIG. 4 illustrates a flow of a part of a manufacturing process of a magnetic head slider in a modification of the embodiment of FIG. 2. Here, the manufacturing process of the magnetic head slider in this modification will be described with reference to FIGS. 3 and 4.

First, an $Al_2O_3$-TiC wafer 30 with the same thickness as that of the conventional wafer is prepared (step S11). Then, by forming many thin-film magnetic head elements and their electrode terminals on the $Al_2O_3$-TiC wafer 30 using the conventional thin-film integration technique, an wafer 32 with a thin-film layer 31 on its surface is obtained (step S12).

Then, a rear surface of this element-integrated wafer 32 is ground to obtain a very thin wafer 33 with a wafer section thickness not including a thickness of the integrated elements, of about several tens μm (step S13). Current working machine can grind the wafer to such thin thickness but in future it may be possible to grind the wafer thinner.

It is possible to integrate thin-film magnetic head elements on an wafer preliminarily thinned. However, in this case, the wafer may be easily deformed during the integration process causing the fabrication process of the thin-film magnetic head elements to become difficult. Thus, it is desired to grind the wafer after the integration of the thin-film magnetic head elements thereon.

Thereafter, the thinned wafer 33 is diced into a plurality of bar members 40 each having a plurality of magnetic head sections aligned (step S14).

On the other hand, a relatively thick zirconia ($ZrO_2$) wafer 35 with the same thickness as that of the conventional $Al_2O_3$-TiC wafer is prepared (step S15). Then, by forming many electrostatic structure actuator elements on the wafer 35 using a semiconductor integration technique, an wafer 37 with the actuator layer 36 on its surface is obtained (step S16).

Then, the wafer 37 is diced into a plurality of bar members 41 each having a plurality of actuator sections aligned (step S17). ABSs are formed on bottom surfaces of the actuator sections of the bar member 41.

Thereafter, a surface of the actuator layer 36 of each bar member 41 for the actuator sections is adhered or bonded to a rear surface of each bar member 40 for the magnetic head sections by a resin adhesive or by a glass bonding to obtain a bar member 42 with a plurality of magnetic head sliders aligned (step S18). Then, each bar member 42 is cut and separated into individual pieces of the magnetic head sliders 39 (step S19).

Figure 5:
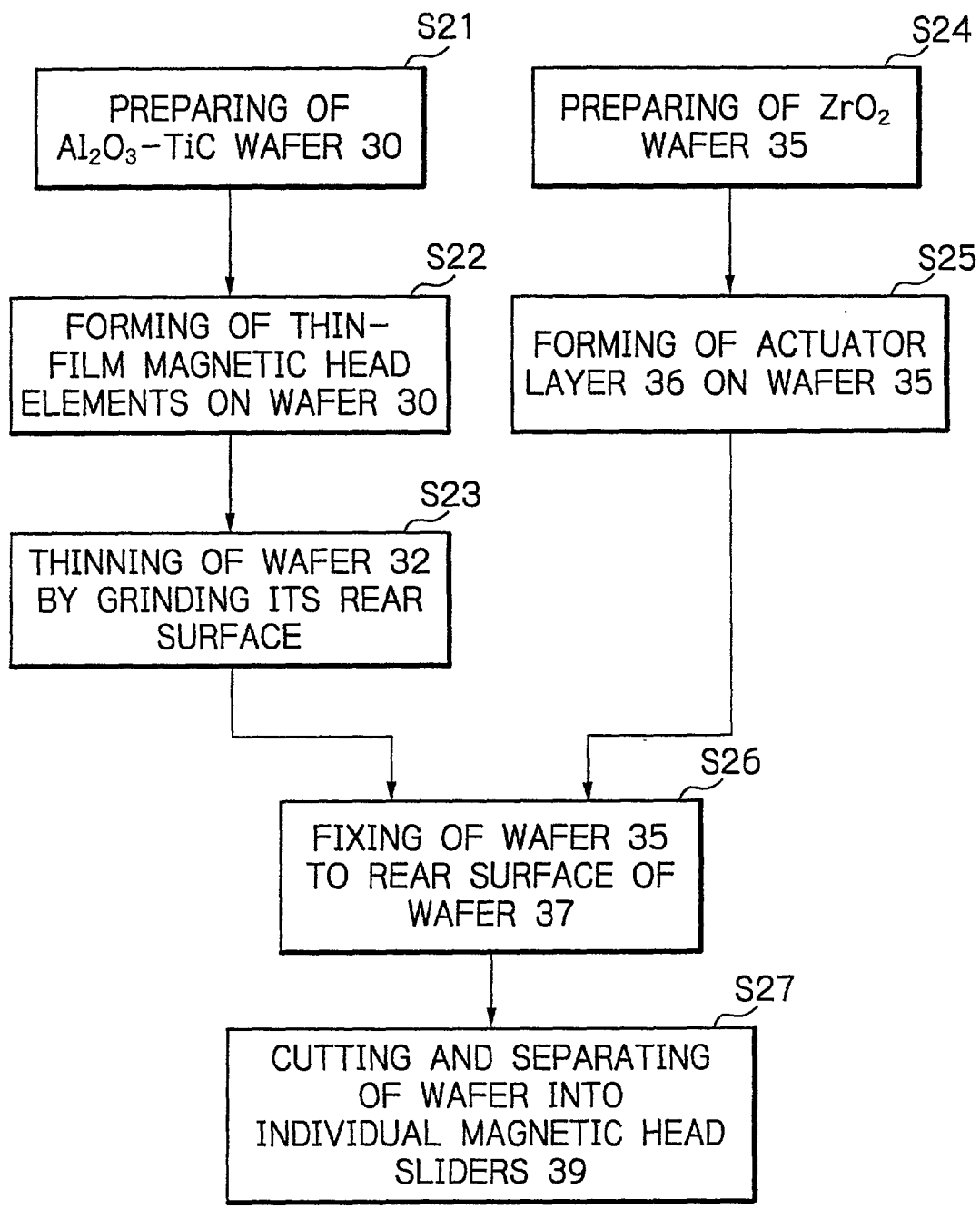
FIG. 5 is a flow chart illustrating a part of a manufacturing process of a magnetic head slider in another modification of the embodiment of FIG. 1.

FIG. 5 illustrates a flow of a part of a manufacturing process of a magnetic head slider in another modification of the embodiment of FIG. 2. Here, the manufacturing process of the magnetic head slider in this modification will be described with reference to FIGS. 3 and 5.

First, an $Al_2O_3$-TiC wafer 30 with the same thickness as that of the conventional wafer is prepared (step S21). Then, by forming many thin-film magnetic head elements and their electrode terminals on the $Al_2O_3$-TiC wafer 30 using the conventional thin-film integration technique, an wafer 32 with a thin-film layer 31 on its surface is obtained (step S22).

Then, a rear surface of this element-integrated wafer 32 is ground to obtain a very thin wafer 33 with a wafer section thickness not including a thickness of the integrated elements, of about several tens μm (step S23). Current working machine can grind the wafer to such thin thickness but in future it may be possible to grind the wafer thinner.

It is possible to integrate thin-film magnetic head elements on an wafer preliminarily thinned. However, in this case, the wafer may be easily deformed during the integration process causing the fabrication process of the thin-film magnetic head elements to become difficult. Thus, it is desired to grind the wafer after the integration of the thin-film magnetic head elements thereon.

On the other hand, a relatively thick zirconia ($ZrO_2$) wafer 35 with the same thickness as that of the conventional $Al_2O_3$-TiC wafer is prepared (step S24). Then, by forming many electrostatic structure actuator elements on the wafer 35 using a semiconductor integration technique, an wafer 37 with the actuator layer 36 on its surface is obtained (step S25).

Then, a surface of the actuator layer 36 of the wafer 35 for the actuator sections is adhered or bonded to a rear surface of the wafer 33 for the magnetic head sections by a resin adhesive or by a glass bonding to obtain an wafer 43 (step S26).

Thereafter, the wafer 43 is cut and separated into individual pieces of magnetic head sliders 39 (step S27). ABSs are formed on bottom surfaces of the actuator sections during this cut and separation process. More concretely, after the wafer 43 is diced into a plurality of bar members each having a plurality of magnetic head sliders aligned, the ABSs are formed on the bottom surfaces of the respective actuator sections and then each bar member is cut and separated into individual pieces of the magnetic head sliders 39.

In the aforementioned embodiment and modifications, the ABSs are formed on the bottom surface of each bar member. However, the ABS may be formed on the bottom surface of each piece of the separated actuator section or the separated magnetic head slider.

Also, in the aforementioned embodiment and modifications, the magnetic head sections are thinned by grinding the rear surface of the element-integrated wafer. However, it is possible to thin the magnetic head section by grinding a rear surface of each bar member with a plurality of magnetic head sections aligned or a rear surface of a separated piece of the magnetic head section.

Figure 6:
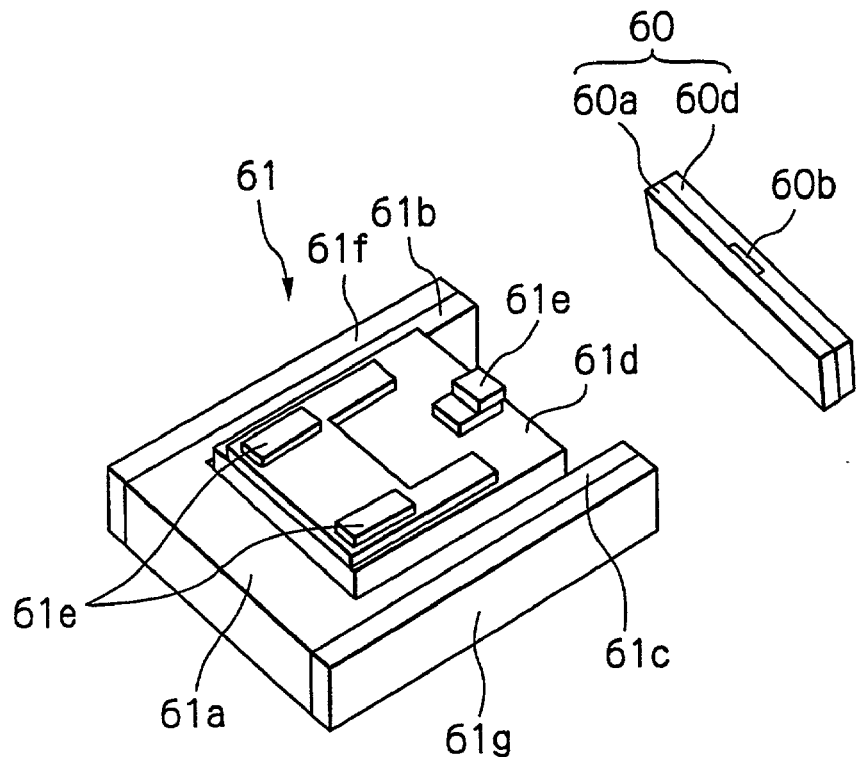
FIG. 6 is an exploded oblique view schematically illustrating a magnetic head slider with a precise positioning actuator in another embodiment according to the present invention.
Figure 7:
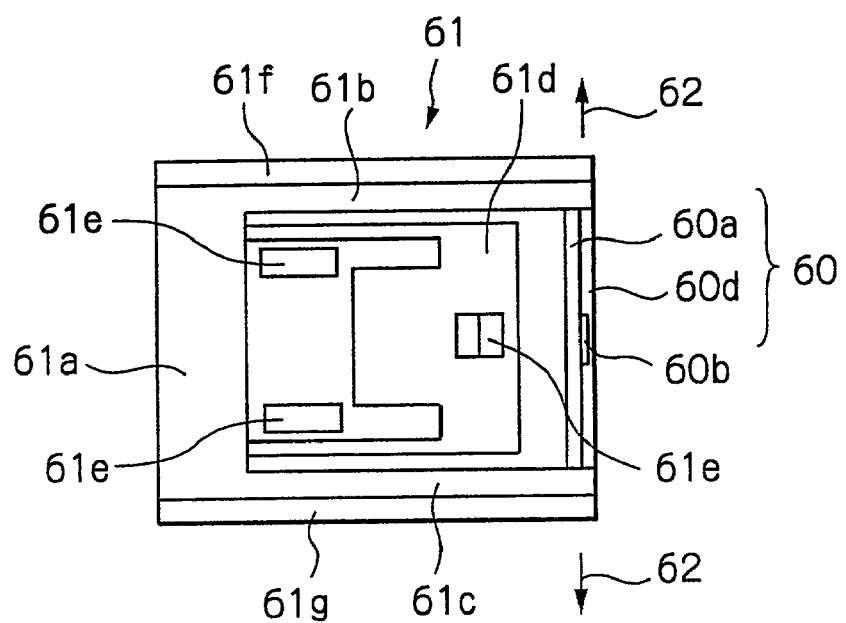
FIG. 7 is a plane view illustrating the magnetic head slider of the embodiment of FIG. 6, seen from the ABS side.

FIG. 6 schematically illustrates a magnetic head slider with a precise positioning actuator in another embodiment according to the present invention, and FIG. 7 illustrates the magnetic head slider of the embodiment of FIG. 6, seen from the ABS side.

In these figures, reference numeral 60 denotes a magnetic head section constituted by a very thin substrate 60a with a thickness of about 50 μm for example and a thin-film layer 60d with a thickness of about 35-50 μm formed on the substrate 60a, and 61 denotes an actuator section fixed by an adhesion for example to both side ends of the magnetic head section 60. The actuator section 61 is located at a rear surface side of the magnetic head section 60, which is opposite to an element-formed surface or a front surface. The thin-film layer 60d includes a thin-film magnetic head element 60b and its terminal electrodes.

The actuator section 61 is constituted by a base 61a, a pair of movable arms 61b and 61c substantially perpendicularly extending frontward from both side ends of the base 61a, and a static part 61d formed between the movable arms 61b and 61c with spaces from these movable arms and substantially perpendicularly extending frontward from the base 61a. The magnetic head section 60 is fixed to the actuator section 61 by for example adhering side surfaces of the magnetic head section 60 to top ends of the movable arms 61b and 61c, respectively.

On a surface of the static part 61d, which is shown in the figure or which is perpendicular to the element-formed surface of the magnetic head section 60, ABSs 61e are formed.

The substrate 60a of the magnetic head section 60, in the embodiment, is an $Al_2O_3$-TiC substrate that has been typically used for a magnetic head slider substrate. However, a thickness, namely a length in a top-and-rear direction, of the substrate 60a is determined to a very small value. The thin-film magnetic head element 60b and its terminal electrodes are fabricated by a thin-film manufacturing process similar to the conventional process.

The actuator section 61 is mainly formed in this embodiment by a zirconia base member with a E-shaped section. The movable arms 61b and 61c of this actuator section 61 are fabricated by forming actuator layers 61f and 61g with a piezoelectric structure on side surfaces of arm members respectively using a semiconductor integrating process, a thick-film laminating process or a printing process. As will be described later, since this actuator section 61 is individually fabricated from the magnetic head section 60, any type of actuator structures such as a piezoelectric effect structure, a electrostrictive effect structure and electromagnetic inductive structure can be easily adopted other than the electrostatic effect structure.

A size of the magnetic head slider with the magnetic head section 60 and the actuator section 61 in this embodiment is 1.25 mm×1.0 mm×0.3 mm for example which is substantially the same as that of the conventional magnetic head slider.

By applying a drive voltage to the actuator layers 61f and 61g via signal electrodes (not shown), the movable arms 61b and 61c linearly displace to a lateral direction as shown by an arrow 62. Thus, the magnetic head section 60 linearly displaces in the lateral direction in a similar manner to precise position the magnetic head element 60b.

Since the magnetic head section 60 that is a movable part is thin and very light in mass, a sufficient displacement can be expected even by a very small drive force. It is important that the displacement is occurred at the magnetic head section 60 only and that no displacement is occurred at the ABSs 61e formed on the static part 61d of the actuator section 61. Therefore, the attitude of the ABSs 61e will not change so as to always keep a stable flying characteristics of the slider.

Because of the extremely light mass of the movable part, following various advantages can be obtained:

(a) An actuator of a low-voltage drive type can be utilized to avoid to have a detrimental effect on an electromagnetic conversion characteristics of the magnetic head element;

(b) An actuator can be formed with a structure and of a material that will present a small displacement force;

(c) High flexibility in designing an actuator can be expected; and (d) A vibration characteristics of a suspension will not be deteriorated because a mechanical resonance occurs at a relatively high frequency.

Figure 8:
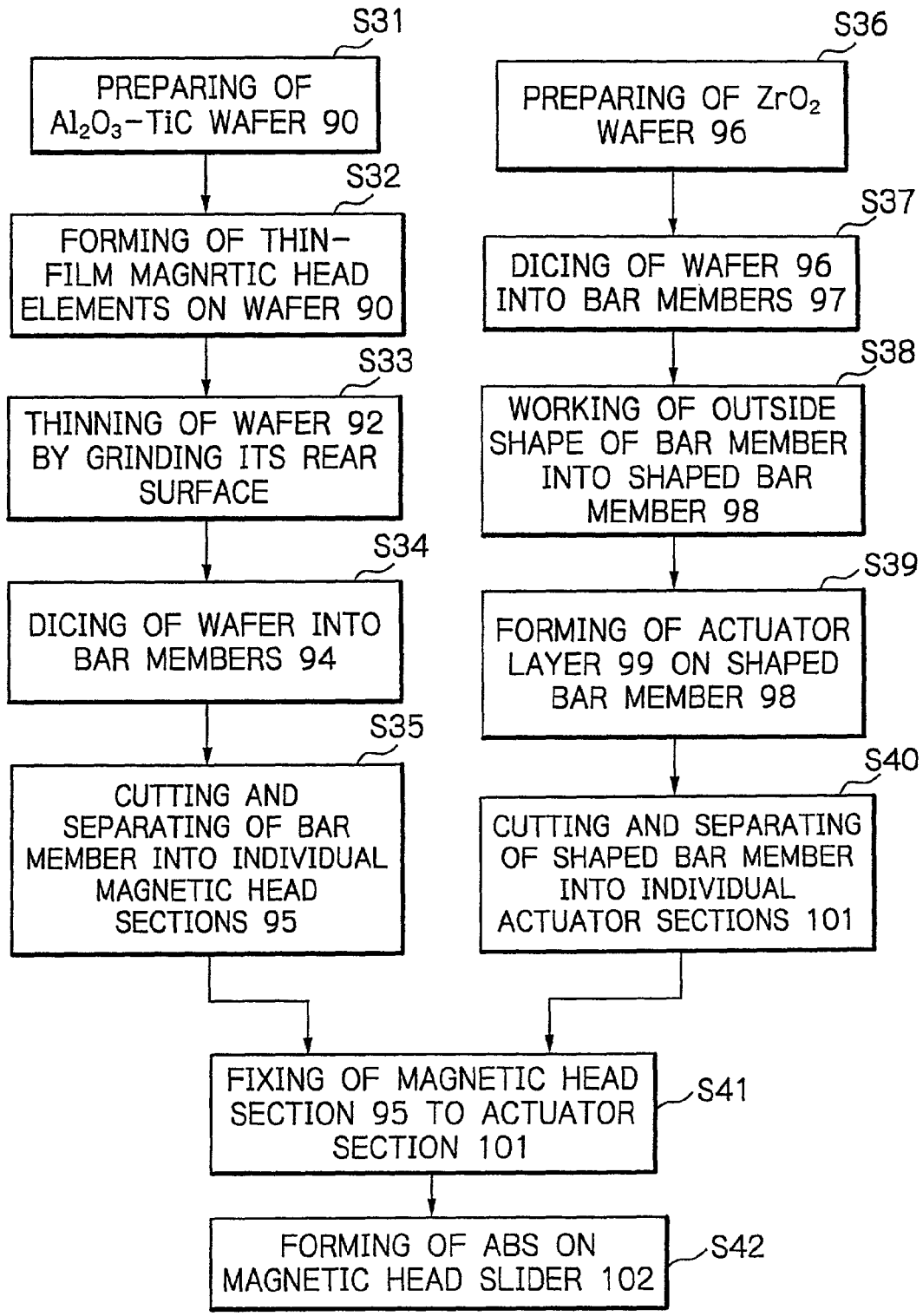
FIG. 8 is a flow chart illustrating a part of a manufacturing process of the magnetic head slider in the embodiment of FIG. 6.
Figure 9:
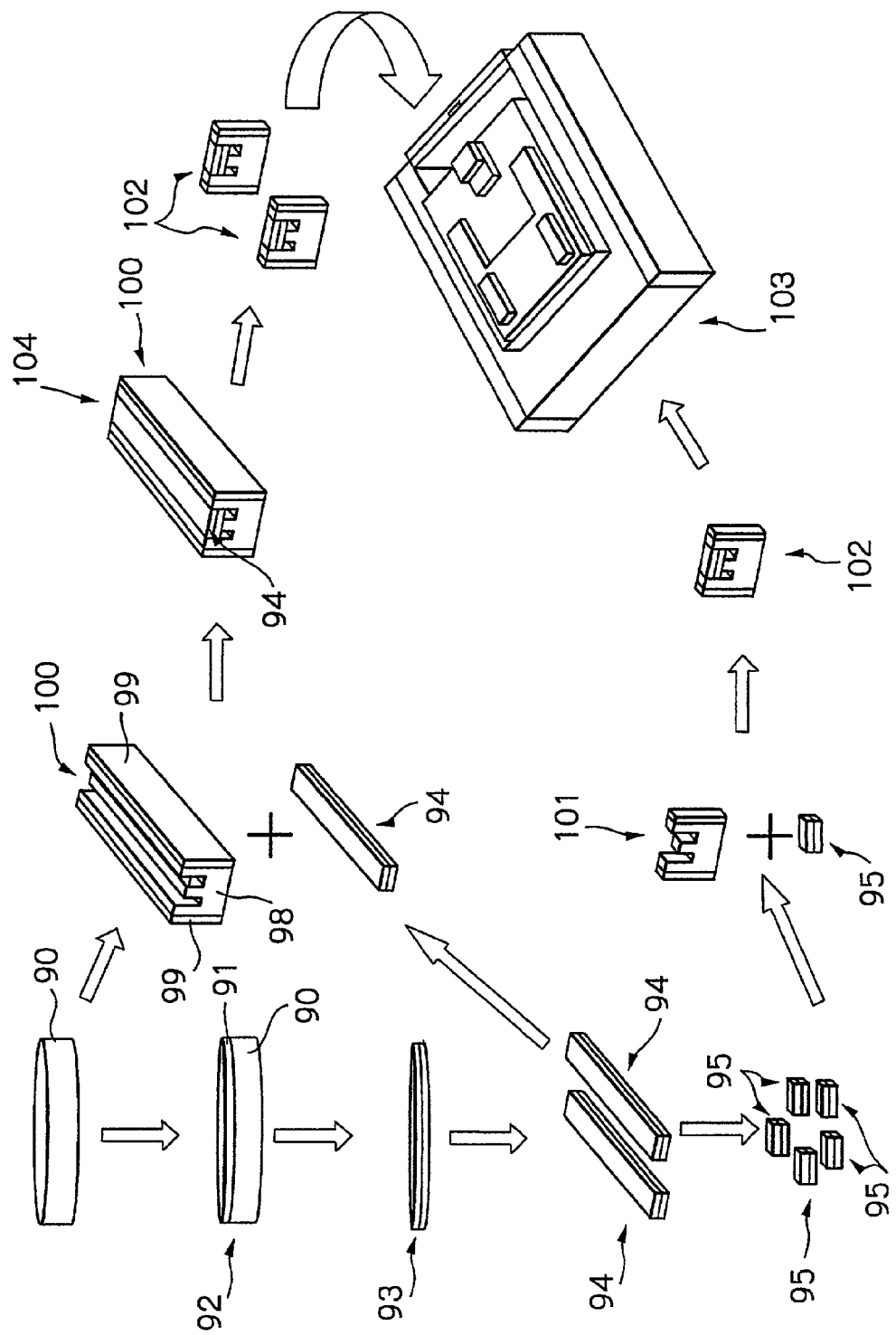
FIG. 9 is a view illustrating a part of a manufacturing process of the magnetic head slider in the embodiment of FIG. 6 and its modifications.

FIG. 8 illustrates a flow of a part of a manufacturing process of the magnetic head slider in the embodiment of FIG. 6, FIG. 9 illustrates a part of a manufacturing process of the magnetic head slider in the embodiment of FIG. 6 and its modifications, and FIG. 9 illustrates a part of a manufacturing process of the actuator section in the embodiment of FIG. 6 and its modifications. Here, the manufacturing process of the magnetic head slider in this embodiment will be described.

First, an $Al_2O_3$-TiC wafer 90 with the same thickness as that of the conventional wafer is prepared (step S31). Then, by forming many thin-film magnetic head elements and their electrode terminals on the $Al_2O_3$-TiC wafer 90 using the conventional thin-film integration technique, an wafer 92 with a thin-film layer 91 on its surface is obtained (step S32).

Then, a rear surface of this element-integrated wafer 92 is ground to obtain a very thin wafer 93 with a wafer section thickness not including a thickness of the integrated elements, of about several tens μm (step S33). Current working machine can grind the wafer to such thin thickness but in future it may be possible to grind the wafer thinner.

It is possible to integrate thin-film magnetic head elements on an wafer preliminarily thinned. However, in this case, the wafer may be easily deformed during the integration process causing the fabrication process of the thin-film magnetic head elements to become difficult. Thus, it is desired to grind the wafer after the integration of the thin-film magnetic head elements thereon.

Thereafter, the thinned wafer 93 is diced into bar members 94 each having a plurality of magnetic head sections aligned (step S34). Then, each bar member 94 is cut and separated into individual pieces of magnetic head sections 95 (step S35).

On the other hand, a relatively thick zirconia ($ZrO_2$) wafer 96 with the same thickness as that of the conventional $Al_2O_3$-TiC wafer is prepared (step S36). Then, this wafer 96 is diced into a plurality of bar members 97 (step S37).

Then, an outside shape of each bar member 97 is worked to form a shaped bar member 98 which has an E-shaped section and includes a base, a pair of movable arms substantially perpendicularly extending frontward from both side ends of the base, and a static part formed between the movable arms with spaces from these movable arms and substantially perpendicularly extending frontward from the base (step S38). Then, actuator layers 99 with a piezoelectric structure are formed on side surfaces of arm members of the shaped bar member 98 to obtain a bar member 100 for actuator sections (step S39). Thereafter, this bar member 100 is cut and separated into individual pieces of actuator sections 101 (step S40).

Thereafter, side surfaces of each magnetic head section piece 95 is adhered or bonded to top end portions of each actuator section piece 101 by a resin adhesive or a glass bonding to be caught therein and thus an individual magnetic head slider 102 is obtained (step S41). Then, by forming ABSs on bottom surfaces of the static part of the magnetic head slider 102, a final magnetic head slider 103 is obtained (step S42).

Figure 10:
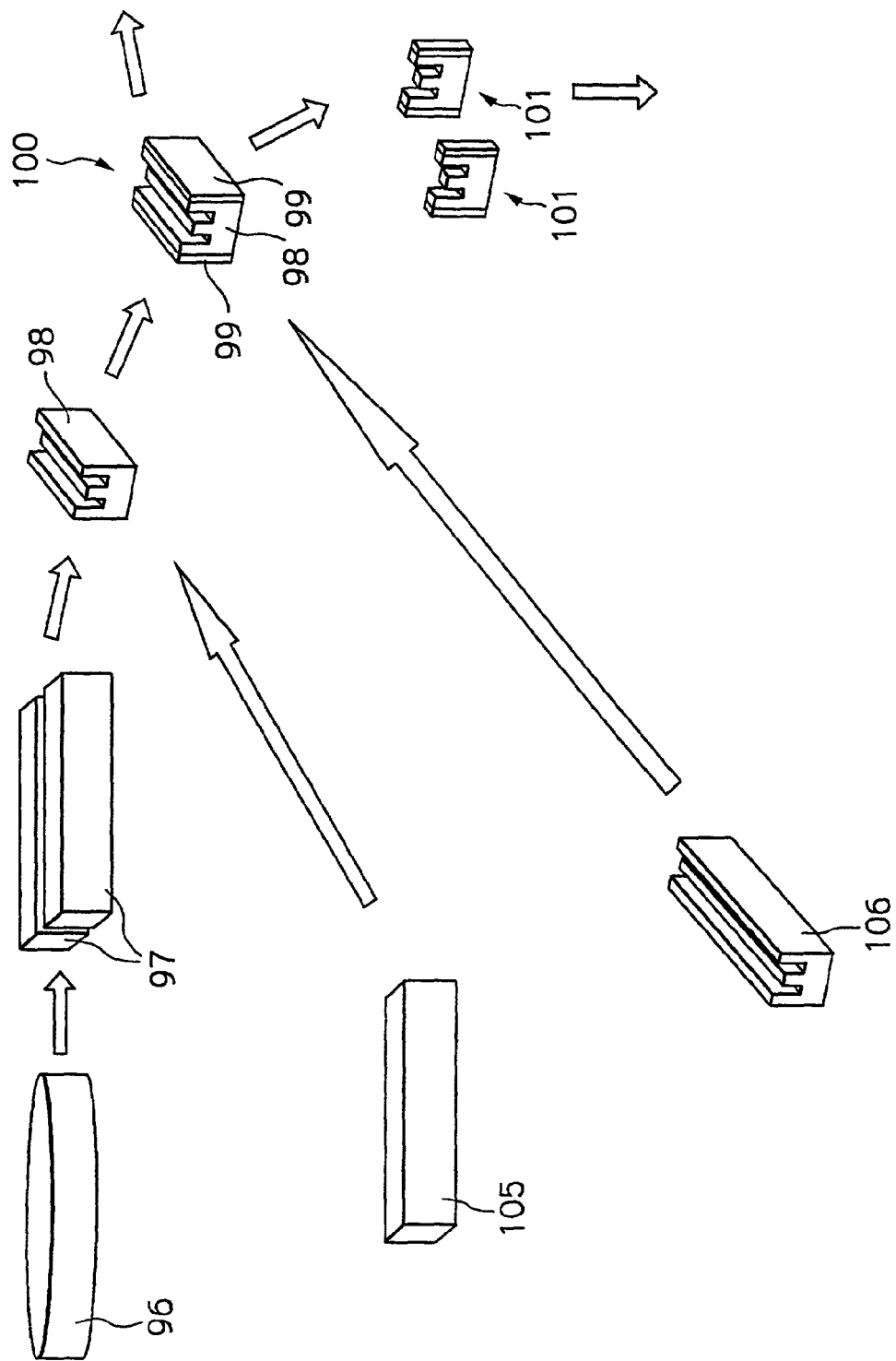
FIG. 10 is a view illustrating a part of a manufacturing process of an actuator section in the embodiment of FIG. 6 and its modifications.
Figure 11:
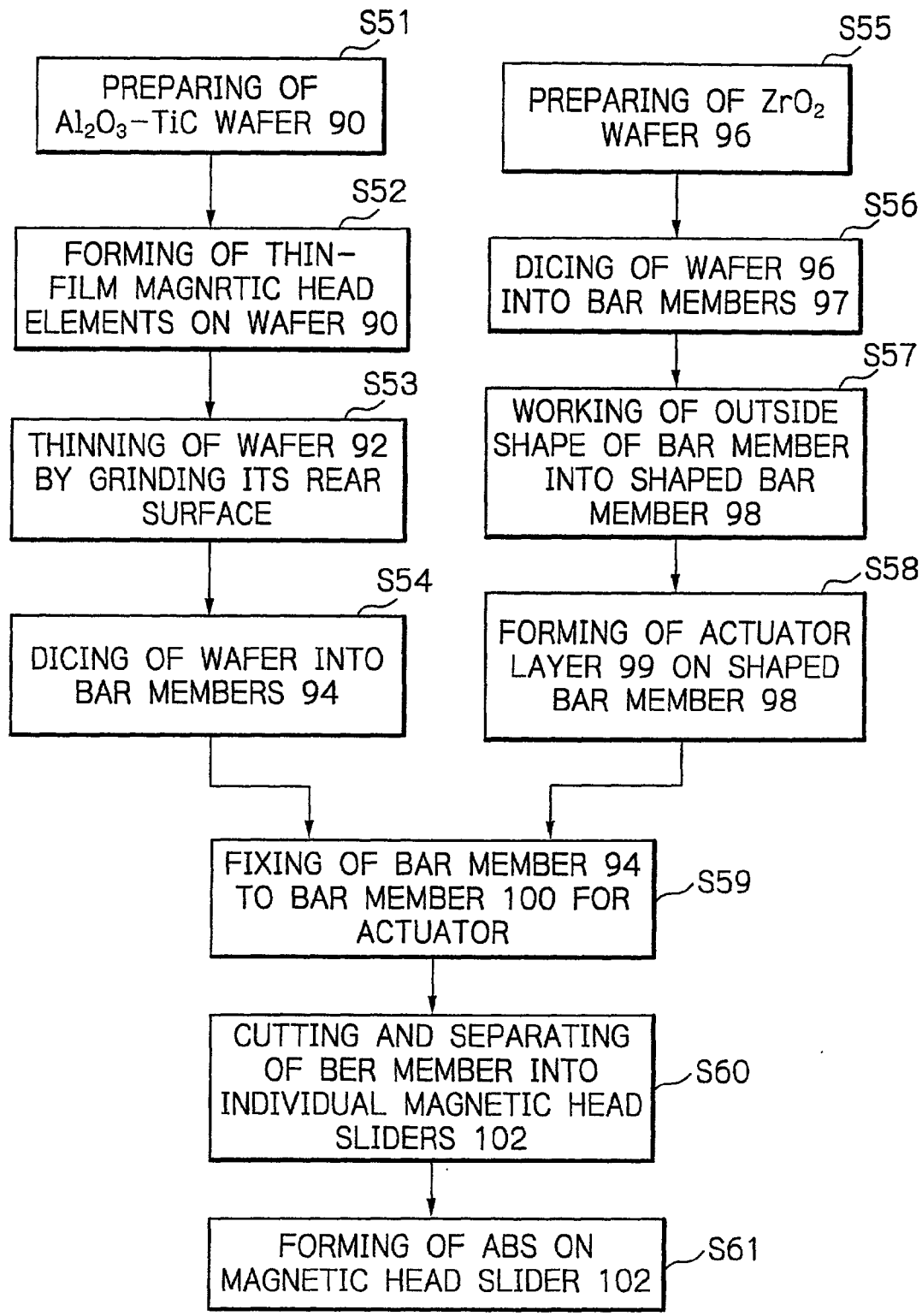
FIG. 11 is a flow chart illustrating a part of a manufacturing process of a magnetic head slider in a modification of the embodiment of FIG. 6.

FIG. 11 illustrates a flow of a part of a manufacturing process of a magnetic head slider in a modification of the embodiment of FIG. 6. Here, the manufacturing process of the magnetic head slider in this modification will be described with reference to FIGS. 9-11.

First, an $Al_2O_3$-TiC wafer 90 with the same thickness as that of the conventional wafer is prepared (step S51). Then, by forming many thin-film magnetic head elements and their electrode terminals on the $Al_2O_3$-TiC wafer 90 using the conventional thin-film integration technique, an wafer 92 with a thin-film layer 91 on its surface is obtained (step S52).

Then, a rear surface of this element-integrated wafer 92 is ground to obtain a very thin wafer 93 with a wafer section thickness not including a thickness of the integrated elements, of about several tens μm (step S53). Current working machine can grind the wafer to such thin thickness but in future it may be possible to grind the wafer thinner.

It is possible to integrate thin-film magnetic head elements on an wafer preliminarily thinned. However, in this case, the wafer may be easily deformed during the integration process causing the fabrication process of the thin-film magnetic head elements to became difficult. Thus, it is desired to grind the wafer after the integration of the thin-film magnetic head elements thereon.

Thereafter, the thinned wafer 93 is diced into bar members 94 each having a plurality of magnetic head sections aligned (step S54).

On the other hand, a relatively thick zirconia ($ZrO_2$) wafer 96 with the same thickness as that of the conventional $Al_2O_3$-TiC wafer is prepared (step S55). Then, this wafer 96 is diced into a plurality of bar members 97 (step S56).

Then, an outside shape of each bar member 97 is worked to form a shaped bar member 98 which has an E-shaped section and includes a base, a pair of movable arms substantially perpendicularly extending frontward from both side ends of the base, and a static part formed between the movable arms with spaces from these movable arms and substantially perpendicularly extending frontward from the base (step S57). Then, actuator layers 99 with a piezoelectric structure are formed on side surfaces of arm members of the shaped bar member 98 to obtain a bar member 100 for actuator sections (step S58).

Then, side surfaces of each bar member 94 is adhered or bonded to top end portions of each bar member 100 for actuator sections by a resin adhesive or a glass bonding to be caught therein and thus a bar member 104 for magnetic head sliders is obtained (step S59).

Thereafter, this bar member 104 is cut and separated into individual pieces of magnetic head sliders 102 (step S60). Then, by forming ABSs on bottom surfaces of the static part of the magnetic head slider 102, a final magnetic head slider 103 is obtained (step S61).

In the aforementioned embodiments and modifications, a plurality of bar members 97 for actuator sections are formed by dicing a zirconia wafer 96. However, a bar member 105 for actuator sections may be directly formed by molding a zirconia material in a bar member shape and by sintering the molded zirconia bar member. Also, a shaped bar member 106 for actuator sections may be directly formed by molding a zirconia material in a bar member with an E-shaped section and by sintering the molded zirconia bar member.

Furthermore, although in the aforementioned embodiments and modifications, a rear surface of an element-integrated wafer is ground to obtain a thin magnetic head section, it is possible to obtain a thin magnetic head section by grinding a rear surface of a bar member for magnetic head sections or a rear surface of each individual magnetic head section.

The present invention has been described with reference to magnetic head sliders with thin-film magnetic head elements. However, it is apparent that the present invention can be applied to a head slider for a head element such as an optical head element other than the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head slider with a precise positioning actuator, comprising:

a thin plane shaped head section provided with a first surface that is substantially perpendicular to an air bearing surface of said head slider, a second surface opposite to said first surface, side surfaces perpendicular to said first and second surfaces and at least one head element formed on said first surface; and an actuator section for precisely positioning said at least one head element, said actuator section including a) a pair of movable arms capable of displacing its top end portions in response to a drive signal applied to said actuator section, both of said side surfaces of said head section being fixed to said top end portions of said pair of movable arms, b) a base to be fixed to a support means of said head slider, said pair of movable arms extending from said base along said air bearing surface wherein the base and pair of movable arms form a U-shape, and c) a static part coupled with said base between and spaced from said pair of movable arms to form an E-shape and the static part spaced from the head section, each movable arm comprising an arm member made of zirconia and a piezoelectric element formed on or fixed to a surface of said arm member.

2. The head slider as claimed in claim 1, wherein said air bearing surface is formed in said static part.

3. The head slider as claimed in claim 1, wherein said at least one head element is at least one thin-film magnetic head element.

4. The head slider as claimed in claim 1, wherein said base of said actuator section is made of zirconia.

5. The head slider as claimed in claim 1, wherein said static part of said actuator section is made of zirconia.

6. A head slider with a precise positioning actuator, comprising:

a thin plane shaped head section provided with a first surface that is substantially perpendicular to an air bearing surface of said head slider, a second surface opposite to said first surface, side surfaces perpendicular to said first and second surfaces and at least one head element formed on said first surface; and an actuator section for precisely positioning said at least one head element, said actuator section including a) a pair of movable arms capable of displacing its top end portions in response to a drive signal applied to said actuator section, both of said side surfaces of said head section being fixed to said top end portions of said pair of movable arms, b) a base to be fixed to a support means of said head slider, said pair of movable arms extending from said base along said air bearing surface wherein the base and pair of movable arms form a U-shaped, and c) a static part coupled with said base between said pair of movable arms to form an E-shape, said static part spaced from said pair of movable arms and the head section via a gap, each movable arm comprising an arm member made of zirconia and a piezoelectric element formed on or fixed to a surface of said arm member.

7. The head slider as claimed in claim 6, wherein said air bearing surface is formed in said static part.

8. The head slider as claimed in claim 6, wherein said at least one head element is at least one thin-film magnetic head element.

9. The head slider as claimed in claim 6, wherein said base of said actuator section is made of zirconia.

10. The head slider as claimed in claim 6, wherein said static part of said actuator section is made of zirconia.

* * * * *